(12) United States Patent
Samad et al.

(10) Patent No.: US 11,554,970 B2
(45) Date of Patent: Jan. 17, 2023

(54) HOT AIR FLOW-CIRCULATION WITHIN A SOLAR DESALINATION SYSTEM

(71) Applicant: Saudi Arabian Oil Company, Dhahran (SA)

(72) Inventors: Nidal Samad, Dhahran (SA); Faleh Subaiei, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 31 days.

(21) Appl. No.: 17/181,691

(22) Filed: Feb. 22, 2021

(65) Prior Publication Data
US 2022/0267170 A1    Aug. 25, 2022

(51) Int. Cl.
| | | |
|---|---|---|
| C02F 1/14 | (2006.01) | |
| C02F 1/12 | (2006.01) | |
| B01D 1/20 | (2006.01) | |
| B01D 1/00 | (2006.01) | |
| B01D 1/14 | (2006.01) | |
| C02F 103/08 | (2006.01) | |
| C02F 101/10 | (2006.01) | |

(52) U.S. Cl.
CPC .............. *C02F 1/14* (2013.01); *B01D 1/0035* (2013.01); *B01D 1/0082* (2013.01); *B01D 1/14* (2013.01); *B01D 1/20* (2013.01); *C02F 1/12* (2013.01); *C02F 2101/10* (2013.01); *C02F 2103/08* (2013.01); *C02F 2209/02* (2013.01); *C02F 2209/40* (2013.01); *C02F 2303/10* (2013.01)

(58) Field of Classification Search
CPC .......... C02F 1/12; C02F 1/14; C02F 2101/10; C02F 2103/08; C02F 2209/02; C02F 2209/40; C02F 2303/10; B01D 1/0035; B01D 1/0082; B01D 1/14; B01D 1/20
See application file for complete search history.

(56) References Cited

U.S. PATENT DOCUMENTS

| | | | | |
|---|---|---|---|---|
| 2,412,466 | A * | 12/1946 | Miller, Jr. ................ | C02F 1/18 203/DIG. 17 |
| 3,397,117 | A * | 8/1968 | Smith ....................... | B63C 9/06 52/2.21 |
| 3,960,668 | A * | 6/1976 | Rush ........................ | C02F 1/14 202/185.1 |
| 4,096,039 | A * | 6/1978 | Gamine ................... | B01D 3/42 202/205 |

(Continued)

*Primary Examiner* — Jonathan Miller
(74) *Attorney, Agent, or Firm* — Bracewell LLP; Constance G. Rhebergen; Keith R. Derrington

(57) ABSTRACT

A method for circulating hot air in a solar desalination system includes providing a desalination structure having an air flow path defined between an external surface layer and an internal surface layer. A return flow conduit provides an internal fluid flow path. Saline water is pumped through a center column in a direction from the base towards the peak. The saline water is delivered through a nozzle that extends through a sidewall of the center column to provide a mist within the desalination structure exterior of the center column. An air flow within the air flow path is heated to form a hot air supply. The mist is heated with the hot air supply to form an evaporated fluid. A diverted portion of the hot air supply is delivered into the return flow conduit and mixed with an ambient air to form and heat the air flow.

19 Claims, 3 Drawing Sheets

(56) References Cited

U.S. PATENT DOCUMENTS

| | | | | |
|---|---|---|---|---|
| 4,235,679 | A | * | 11/1980 | Swaidan .............. B01D 5/0066 |
| | | | | 203/DIG. 1 |
| 4,343,683 | A | | 8/1982 | Diggs |
| 5,588,779 | A | | 12/1996 | Merrett |
| 6,274,004 | B1 | | 8/2001 | Andersen |
| 6,500,216 | B1 | | 12/2002 | Takayasu |
| 7,897,019 | B2 | * | 3/2011 | Akers ...................... B01D 1/14 |
| | | | | 261/153 |
| 9,623,344 | B2 | * | 4/2017 | Bosch I Bosch .... B01D 1/0035 |
| 10,138,140 | B2 | * | 11/2018 | Beckman .................. C02F 1/14 |
| 2004/0060808 | A1 | * | 4/2004 | LaViolette .............. F24S 10/25 |
| | | | | 203/1 |
| 2012/0292176 | A1 | * | 11/2012 | Machhammmer ....... B01D 1/16 |
| | | | | 202/153 |
| 2014/0054159 | A1 | * | 2/2014 | Bosch I Bosch .... B01D 1/0035 |
| | | | | 202/234 |
| 2018/0079659 | A1 | * | 3/2018 | Beckman ................ B01D 1/14 |

* cited by examiner

HOT AIR FLOW-CIRCULATION WITHIN A SOLAR DESALINATION SYSTEM

BACKGROUND OF THE DISCLOSURE

1. Field of the Disclosure

The present disclosure relates to a solar desalination system, and more specifically, the disclosure relates to the flow of hot air within a desalination system.

2. Description of the Related Art

In a desalination system salt is separated from water. The salt can be sold for economic reasons. Common currently available technologies for desalination include membrane separation, such as reverse osmosis, and thermal desalination, such as multiple effect distillation.

SUMMARY OF THE DISCLOSURE

The currently available technologies for desalination of membrane separation and multiple effect distillation are energy intensive with limited recovery efficiency. With regard to technologies using renewable energy such as the sun, some currently available systems use solar heat collectors or electricity producing cells which are not efficient. Other desalination systems utilize a greenhouse to collect the energy and use the energy to evaporate the water. However, these systems depend on deep cold seawater for condensation during the desalination process.

Embodiments of the disclosure provide methods and systems for desalination that use solar energy to recover 100% of the water, and produce salt that can be sold to offset some of the capital and operating costs of the desalination system. Methods and systems of this disclosure include transferring the sun's energy to a volume of air confined between two surfaces of a structure elevating the temperature of the air when it reaches the top of the structure. The low quality water is released into this very hot environment in a form of fine mist, converting the low quality water to vapor and leaving behind the impurities and salts. The produced vapor is driven down through a condensing system, turning the vapor into fresh water. Energy released during the phase change can be used to pre-heat the low quality feed water. Because all of the impurities and salt is removed from the low quality water, the process creates no liquid waste stream.

In an embodiment of this disclosure, a method for circulating hot air in a solar desalination system includes providing a desalination structure. The desalination structure has an inclined outer surface with a base that is larger in diameter than a peak. The inclined outer surface has an external surface layer that is transparent, and an internal surface layer that is dark in color. An air flow path is defined between the external surface layer and the internal surface layer, providing an external fluid flow path from the base towards the peak. A return flow conduit provides an internal fluid flow path in a direction from the peak towards the base. A center column has an internal bore and is located along an axis of the desalination structure. The method further includes pumping a saline water through the center column in a direction from the base towards the peak. The saline water is delivered through a nozzle that extends through a sidewall of the center column to provide a mist within the desalination structure exterior of the center column. An air flow from a base is heated within the air flow path to form a hot air supply. The mist is heated with the hot air supply delivered through the air flow path to form an evaporated fluid. A diverted portion of the hot air supply is diverted into the return flow conduit. The diverted portion of the hot air supply is mixed with an ambient air to form the air flow. The diverted portion of the hot air supply heats the air flow.

In alternate embodiments, heating the air flow to form the hot air supply can include heating the air flow to a temperature that vaporizes the saline water that is delivered through the nozzle. Providing the desalination structure can include providing the desalination structure with a shape that has eight sides. Diverting the diverted portion of the hot air supply can include directing the diverted portion of the hot air supply through an opening of the return flow conduit at a location outside of the external fluid flow path.

In other alternate embodiments, diverting the diverted portion of the hot air supply can include directing the diverted portion of the hot air supply through an opening of the return flow conduit at a location along the external fluid flow path. The temperature of the hot air can be monitored and the pumping of the saline water through the center column can be adjusted to change a flow rate of the saline water being delivered through the center column based on the temperature of the hot air. The flow rate of the saline water being delivered through the center column can be increased when the temperature of the hot air increases, and the flow rate of the saline water being delivered through the center column can be decreased when the temperature of the hot air decreases.

In an alternate embodiment of this disclosure, a method for circulating hot air in a solar desalination system includes providing a desalination structure. The desalination structure has an outer surface with an external surface layer, and an internal surface layer. An air flow path is defined between the external surface layer and the internal surface layer, providing an external fluid flow path in a direction from a base to a peak. A return flow conduit provides an internal fluid flow path in a direction from the peak towards the base. A center column has an internal bore and is located along an axis of the desalination structure. The method further includes pumping a saline water through a water supply line located within the center column. The saline water is sprayed to provide a mist to an evaporization zone within the desalination structure exterior of the center column. An air flow from a base within the air flow path is heated to form a hot air supply. The mist is heated with the hot air supply delivered through the air flow path to the evaporization zone to evaporate the mist within the evaporization zone and form an evaporated fluid. A diverted portion of the hot air supply is diverted into the return flow conduit and the diverted portion of the hot air supply is mixed with an ambient air to form the air flow. The evaporated fluid is condensed within the center column. The diverted portion of the hot air supply heats the air flow. The evaporated fluid traveling in a direction from the peak towards the base heats the saline water as the saline water travels in a direction from the base towards the peak.

In alternate embodiments, heating the air flow to form the hot air supply can include heating the air flow to a temperature that vaporizes the saline water that is delivered through the nozzle. Providing the desalination structure can include providing the desalination structure with a shape that is an eight sided pyramid. Diverting the diverted portion of the hot air supply can include directing the diverted portion of the hot air supply through an opening of the return flow conduit at a location within the evaporation zone. Diverting the diverted portion of the hot air supply can include directing the diverted portion of the hot air supply through an opening of the return flow conduit at a location along the external fluid flow path.

In other alternate embodiments, the method can include monitoring a temperature of the hot air. The flow rate of the saline water being delivered through the center column can be increased when the temperature of the hot air increases. The flow rate of the saline water being delivered through the center column can be decreased when the temperature of the hot air decreases.

In yet another embodiment of this disclosure, a system for circulating hot air in a solar desalination system includes a desalination structure. The desalination structure has an inclined outer surface with a base that is larger in diameter than a peak. The inclined outer surface has an external surface layer that is transparent, and an internal surface layer that is dark in color. An air flow path defined between the external surface layer and the internal surface layer provides an external fluid flow path from the base towards the peak. A return flow conduit provides an internal fluid flow path in a direction from the peak towards the base. A center column has an internal bore and is located along an axis of the desalination structure. A nozzle extends through a sidewall of the center column. The nozzle is operable to deliver a saline water through the nozzle to provide a mist within the desalination structure exterior of the center column. The air flow path is oriented to heat an air flow from a base within the air flow path to form a hot air supply so that the hot air supply is delivered through the air flow path and heats the mist to form an evaporated fluid. The return flow conduit is oriented to divert a diverted portion of the hot air supply through the air flow path and into the return flow conduit, mixing the diverted portion of the hot air supply with an ambient air to form the air flow, the diverted portion of the hot air supply heating the air flow.

In alternate embodiments, the air flow can be at a temperature that vaporizes the saline water that is delivered through the nozzle. The desalination structure can have a shape that has eight sides. An opening of the return flow conduit can be at a location outside of the external fluid flow path. An opening of the return flow conduit can be at a location along the external fluid flow path. A temperature sensor can be operable to monitor a temperature of the hot air. A pump can be operable to adjust a flow rate of the saline water through the center column based on the temperature of the hot air.

BRIEF DESCRIPTION OF THE DRAWINGS

So that the manner in which the features, aspects and advantages of the embodiments of this disclosure, as well as others that will become apparent, are attained and can be understood in detail, a more particular description of the disclosure may be had by reference to the embodiments thereof that are illustrated in the drawings that form a part of this specification. It is to be noted, however, that the appended drawings illustrate only certain embodiments of the disclosure and are, therefore, not to be considered limiting of the disclosure's scope, for the disclosure may admit to other equally effective embodiments.

DETAILED DESCRIPTION

The disclosure refers to particular features, including process or method steps. Those of skill in the art understand that the disclosure is not limited to or by the description of embodiments given in the specification. The subject matter of this disclosure is not restricted except only in the spirit of the specification and appended Claims.

Those of skill in the art also understand that the terminology used for describing particular embodiments does not limit the scope or breadth of the embodiments of the disclosure. In interpreting the specification and appended Claims, all terms should be interpreted in the broadest possible manner consistent with the context of each term. All technical and scientific terms used in the specification and appended Claims have the same meaning as commonly understood by one of ordinary skill in the art to which this disclosure belongs unless defined otherwise.

As used in the Specification and appended Claims, the singular forms "a", "an", and "the" include plural references unless the context clearly indicates otherwise.

As used, the words "comprise," "has," "includes", and all other grammatical variations are each intended to have an open, non-limiting meaning that does not exclude additional elements, components or steps. Embodiments of the present disclosure may suitably "comprise", "consist" or "consist essentially of" the limiting features disclosed, and may be practiced in the absence of a limiting feature not disclosed. For example, it can be recognized by those skilled in the art that certain steps can be combined into a single step.

Where a range of values is provided in the Specification or in the appended Claims, it is understood that the interval encompasses each intervening value between the upper limit and the lower limit as well as the upper limit and the lower limit. The disclosure encompasses and bounds smaller ranges of the interval subject to any specific exclusion provided.

Where reference is made in the specification and appended Claims to a method comprising two or more defined steps, the defined steps can be carried out in any order or simultaneously except where the context excludes that possibility.

Figure 1:
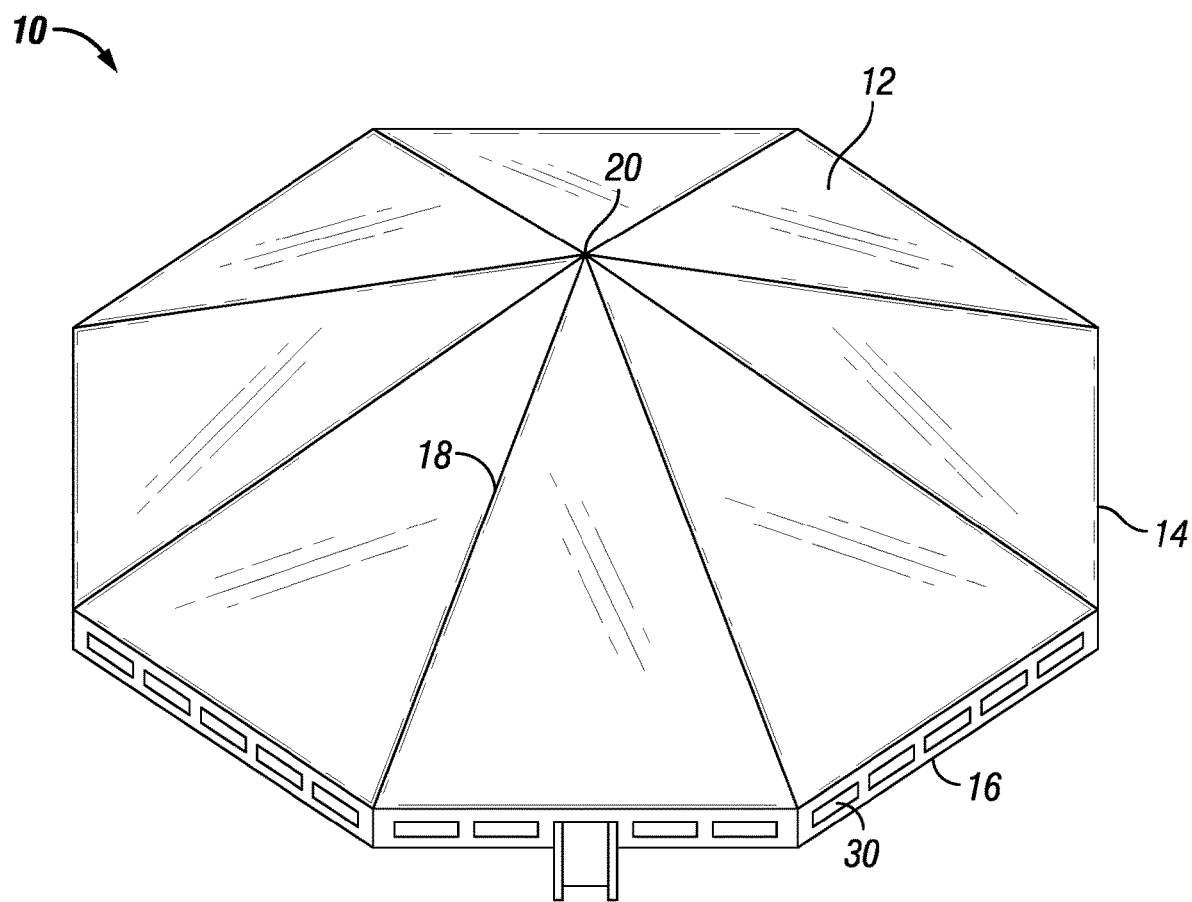
FIG. 1 is a perspective view of a solar desalination system, in accordance with an embodiment of this disclosure.

Looking at FIG. 1, desalination structure 10 can be utilized for removing salt and impurities from a saline water. Desalination structure 10 can be a floating structure used in a body of water, or can be used on land. In the example embodiment of FIG. 1, desalination structure 10 is an octagonal pyramid defined by eight triangular shaped side pieces 12. Sides pieces 12 are arranged around the axis Ax of desalination structure 10.

The bottom 14 of each triangular side piece 12 is in contact with the bottom 14 of the adjacent triangular side piece 12 so that desalination structure 10 has a base 14 that is octagonal in shape. The edges 18 of each side piece 12 contact an adjacent side piece 12 along the entire length of the edge 18. The top point of each side piece 12 come together at peak 20 of desalination structure 10. In alternate embodiments, desalination structure 10 can have a number of sides that is less than eight. In other alternate embodiments, desalination structure 10 can have a number of sides that is greater than eight.

Figure 2:
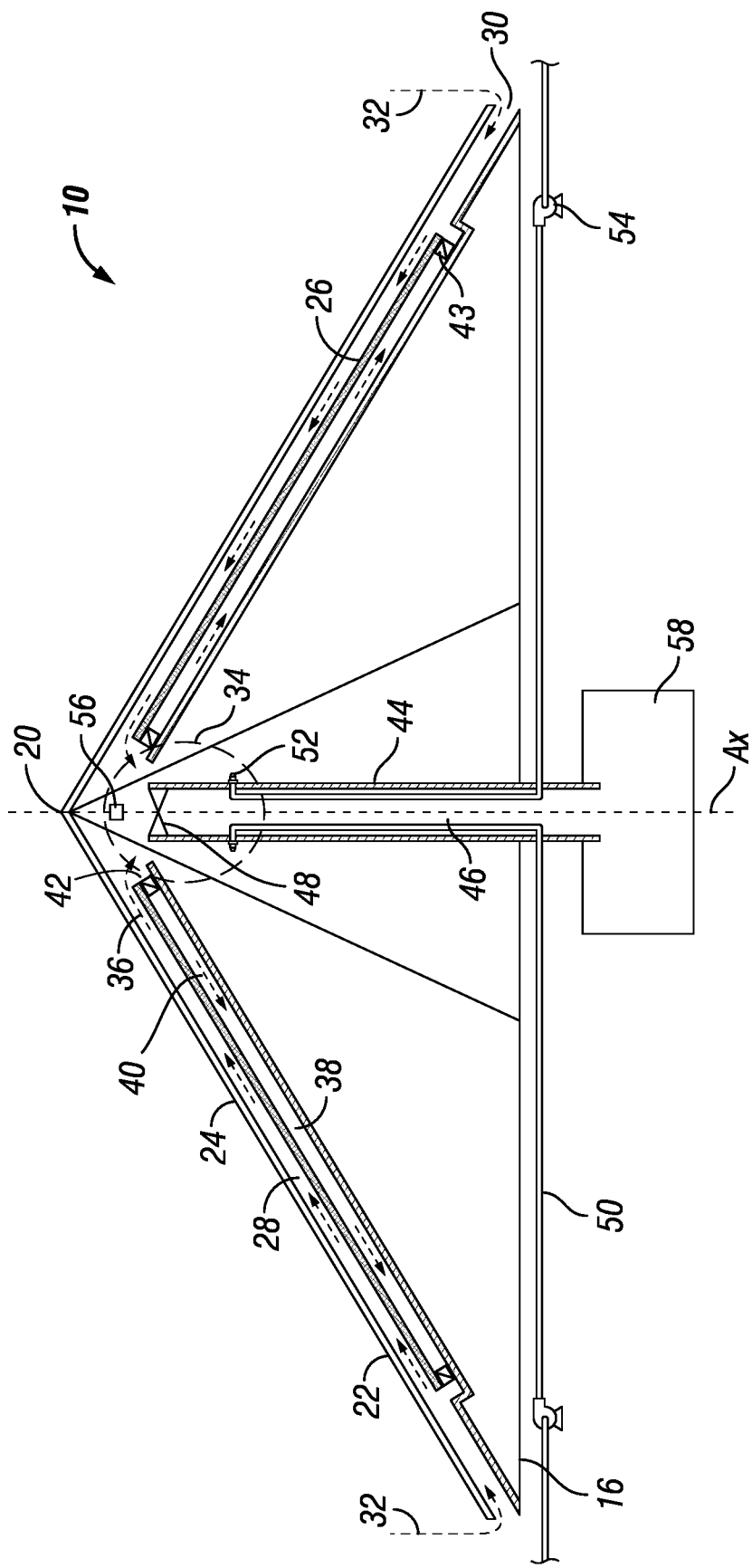
FIG. 2 is a section view of a solar desalination system, in accordance with an embodiment of this disclosure.
Figure 3:
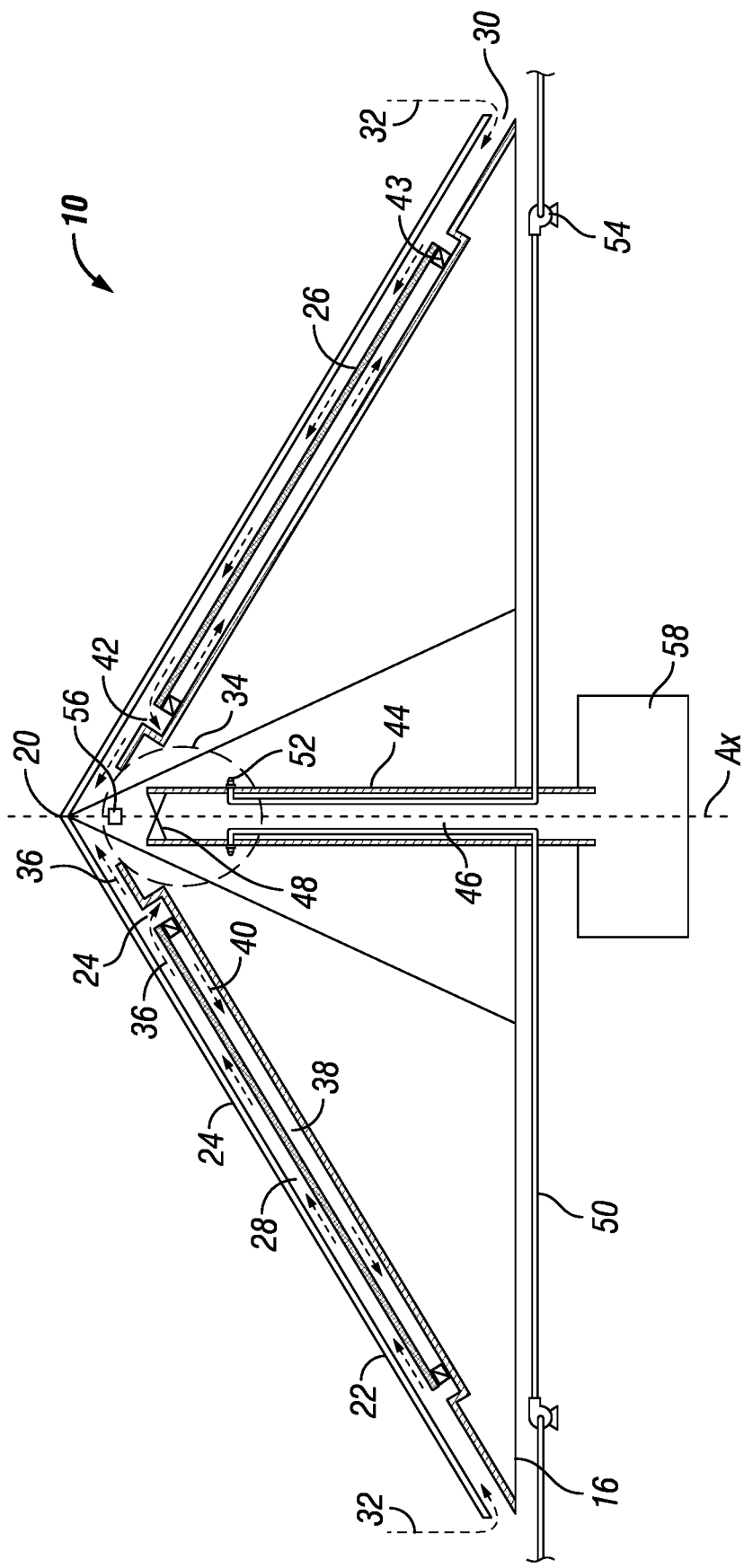
FIG. 3 is a section view of a solar desalination system, in accordance with an alternate embodiment of this disclosure.

Looking at FIGS. 2-3, desalination structure 10 has an inclined outer surface 22 that is defined by side pieces 12. Inclined outer surface 22 has base 16 at the bottom side of inclined outer surface 22 and peak 20 at the top of inclined outer surface 22. Base 16 is larger in diameter than peak 20.

Inclined outer surface 22 includes external surface layer 24 and internal surface layer 26. External surface layer 24 defines the outer surface of desalination structure 10. External surface layer 24 is transparent so that light can pass through external surface layer 24. Internal surface layer 26 is located in a direction inward of external surface layer 24 related to external surface layer 24. Internal surface layer 26 is dark in color so that light that passes through external surface layer 24 is absorbed by internal surface layer 26. As an example, internal surface layer 26 can be black in color.

Air flow path 28 is defined between external surface layer 24 and internal surface layer 26. Air flow path 28 provides an external fluid flow path from base 16 towards peak 20. Air flow path 28 has air entrance 30 that is located at or adjacent to base 16. Ambient air 32 can enter air entrance 30 and the air flow can pass through air flow path 28 to reach an evaporation zone 34 within the interior of desalination structure 10. As the air flow travels along air flow path 28 from base 16 in a direction towards peak 20 the air flow is heated by the sun so that when the air flow reaches evaporation zone 34, the air flow is hot air supply 36.

Desalination structure 10 also includes return flow conduit 38. Return flow conduit 38 provides an internal fluid flow path. Fluid can flow through return flow conduit 38 in a direction from peak 20 towards base 16. A diverted portion 40 of the hot air supply that is delivered through air flow path 28 can be diverted into return flow conduit 38. Diverted portion 40 of the hot air supply can be mixed with the ambient air 32 that has entered air entrance 30 to form the air flow. Diverted portion 40 of the hot air supply that is delivered through air flow path 28 and mixes with the ambient air 32 can heat the air flow.

The diverted portion 40 of the hot air supply is directed through an opening 42 of return flow conduit 38. In the example embodiment of FIG. 2, opening 42 is at a location outside of air flow path 28, which defines the external fluid flow path. In such an embodiment opening 42 can be at a location within evaporation zone 34. Having opening 42 located outside or past air flow path 28 can maximize the temperature of diverted portion 40 as diverted portion 40 is directed into opening 42.

In the example embodiment of FIG. 3, opening 42 is at a location along air flow path 28, which defines the external fluid flow path. In such an embodiment, opening 42 meets air flow path 28 at a location upstream from where hot air supply is delivered to evaporation zone 34. Opening 42 passes through internal surface layer 26.

In certain embodiments, return flow conduit 38 can include flow device 43. In the example embodiments of FIGS. 2-3, there are flow devices 43 at both an entrance and a discharge of return flow conduit 38. In alternate embodiments, there may only be a flow device 43 at the entrance of return flow conduit 38 or a discharge of return flow conduit 38. Flow device 43 can be used to push or such more or less diverted portion 40 out of or into return flow conduit 38 for mixing with ambient air 32. Flow device 43 can be, for example, a fan or a pump.

Looking at FIGS. 2-3, desalination structure 10 further includes center column 44. Center column 44 extends from base 16 to evaporation zone 34 within the interior of desalination structure 10. Center column 44 has internal bore 46 and located along the axis Ax of desalination structure 10 so that an upper end of center column 44 is aligned with peak 20. Fan member 48 is located at or proximate to the upper end of center column 44. Fan member 48 can direct the hot water vapor downward into the condensing column and controls the flow of fluids into internal bore 46 of center column 44.

Water supply line 50 extends from outside of desalination structure 10 into internal bore 46 of center column 44. Water supply line 50 delivers saline water from outside of desalination structure 10 into the interior of desalination structure. Water supply line 50 extends from base 16 in a direction towards peak 20 within internal bore 46 of center column 44. Nozzle 52 is located at a downstream end of water supply line 50. Nozzle 52 extends through a sidewall of center column 44. Nozzle 52 can deliver the saline water into evaporation zone 34 within the interior of desalination structure 10 and exterior of center column 44 in a fine droplet or mist state.

The saline water can be pumped through water supply line 50 with pump 54. Pump 54 can provide the lift required to spray the saline water through nozzle 52 to form the mist. Pump 54 pumps the saline water in a direction from base 16 towards peak 20. Temperature sensor 56 can detect and monitor a temperature of the hot air supply within evaporation zone 34. Pump 54 can be adjusted so that the pumping of the saline water through center column 44 to change a flow rate of the saline water being delivered through center column 44 based on the temperature of the hot air.

Tank 58 is located at a lower end of center column 44. Tank 58 can collect fluids that enter center column 44 by way of fan member 48.

In an example of operation, saline seawater is pumped through water supply line 50 within internal bore 46 of center column 44 in a direction from base 16 towards peak 20 with pump 54. The saline seawater is delivered through nozzle 52 to provide a mist formed from the saline seawater within the interior of desalination structure 10 exterior of center column 44. The mist is released from nozzles 52 inside evaporation zone 34. The temperature of evaporation zone 32 can reach a temperature that will result in the vaporization of the saline seawater that is emitted from nozzle 52. The saline seawater vaporizes almost instantaneously as soon as it is emitted from nozzle 52 due to the high temperature of the evaporation zone 34.

An air flow is directed in a direction from base 16 towards peak 20 within air flow path 28. The air flow is heated within air flow 28 to form hot air supply 36. Hot air supply is also delivered to evaporation zone 34. The mist is heated by hot air supply 36 to form an evaporated fluid. As the saline seawater is converted to a fine mist and evaporated, the impurities and salts within the mist and evaporated fluid are dropped within the interior of desalination structure 10, outside of center column 44. The salts and impurities that drop within the interior of desalination structure 10 can be collected for further processing, disposal, or sale.

A diverted portion 40 of hot air supply 36 that is delivered through air flow path 28 is redirected in a direction opposite the direction taken by the air flow and passes through opening 42 and into return flow conduit 38. Diverted portion 40 mixes with ambient air 32 that is entering air flow path 28 to form the air flow. Diverted portion 40 helps to heat the air flow so that together with the heating of the air flow by the sun, hot air supply 36 can be heated to a temperature that vaporizes the saline water that is delivered through the nozzle.

Diverted portion 40 can provide additional heat to the air flow so that hot air supply 36 can reach temperatures that are higher than could be obtained if diverted portion 40 was not provided. Diverted portion 40 can provide additional heat to the air flow so that hot air supply 36 can reach temperatures that are higher than could be obtained if only the sun was used to heat hot air supply 36. Consequently the use of diverted portion 40 to heat the air flow increases the water production rate per square meter of surface area of desalination structure 10.

The temperature of hot air supply 36 can be monitored with temperature sensor 56. The flow rate of the delivery of the saline water being delivered through water supply line 50 within center column 44 can be adjusted by adjusting pump 54. If the temperature of hot air supply increases, then pump 54 can be adjusted to deliver an increased flow rate of saline water through water supply line 50 within center column 44. The increased temperature of hot air supply 36 allows the hot air supply 36 to evaporate an increased amount of mist that is formed from the saline water.

If the temperature of hot air supply decreases, then pump 54 can be adjusted to deliver a decreased flow rate of saline water through water supply line 50 within center column 44. The decreased temperature of hot air supply 36 results in hot air supply 36 being capable of evaporating a decreased amount of mist that is formed from the saline water.

The evaporated fluid can enter internal bore 46 of center column 44 through fan member 48. The evaporated fluid can be a fluid that is completely free of any salt or impurities. No liquid waste stream is created. The evaporated fluid can be condensed within internal bore 46 of center column 44 and flow into tank 58. As the evaporated fluid is traveling in a direction from peak 20 towards base 16 and being condensed, the heat released by such condensation can heat the saline water that is traveling in a direction from base 16 towards peak 20 within water supply line 50.

Embodiments of this disclosure, therefore, are well adapted to carry out the objects and attain the ends and advantages mentioned, as well as others that are inherent. While embodiments of the disclosure has been given for purposes of disclosure, numerous changes exist in the details of procedures for accomplishing the desired results. These and other similar modifications will readily suggest themselves to those skilled in the art, and are intended to be encompassed within the spirit of the present disclosure and the scope of the appended claims.

What is claimed is:

1. A method for circulating hot air in a solar desalination system, the method including:
   providing a desalination structure, the desalination structure having:
      an inclined outer surface with a base that is larger in diameter than a peak, the inclined outer surface having an external surface layer that is transparent, and an internal surface layer that is dark in color, with an air flow path defined between the external surface layer and the internal surface layer providing an external fluid flow path from the base towards the peak;
      a return flow conduit defined between an internal entrance flow conduit and an internal discharge flow conduit, the return flow conduit providing an internal fluid flow path in a direction from the peak towards the base; and
      a center column having an internal bore and located along an axis of the desalination structure, where the external fluid flow path and the internal fluid flow path are spaced apart from an evaporation zone, the evaporation zone being located within the desalination structure exterior of the center column;
   pumping a saline water through the center column in a direction from the base towards the peak;
   delivering the saline water through a nozzle that extends through a sidewall of the center column to provide a mist within the evaporation zone;
   heating an air flow from a base within the air flow path to form a hot air supply;
   heating the mist with the hot air supply delivered through the air flow path to form an evaporated fluid;
   diverting a diverted portion of the hot air supply into the return flow conduit and mixing the diverted portion of the hot air supply with an ambient air to form the air flow; where
   the diverted portion of the hot air supply heats the air flow.

2. The method of claim 1, where heating the air flow to form the hot air supply includes heating the air flow to a temperature that vaporizes the saline water that is delivered through the nozzle.

3. The method of claim 1, where providing the desalination structure includes providing the desalination structure with a shape that has eight sides.

4. The method of claim 1, where diverting the diverted portion of the hot air supply includes directing the diverted portion of the hot air supply through an opening of the return flow conduit at a location outside of the external fluid flow path.

5. The method of claim 1, where diverting the diverted portion of the hot air supply includes directing the diverted portion of the hot air supply through an opening of the return flow conduit at a location along the external fluid flow path.

6. The method of claim 1, further including monitoring a temperature of the hot air and adjusting the pumping of the saline water through the center column to change a flow rate of the saline water being delivered through the center column based on the temperature of the hot air.

7. The method of claim 6, further including increasing the flow rate of the saline water being delivered through the center column when the temperature of the hot air increases, and decreasing the flow rate of the saline water being delivered through the center column when the temperature of the hot air decreases.

8. A method for circulating hot air in a solar desalination system, the method including:
   providing a desalination structure, the desalination structure having:
      an outer surface with an external surface layer, and an internal surface layer, with an air flow path defined between the external surface layer and the internal surface layer providing an external fluid flow path in a direction from a base to a peak;
      a return flow conduit defined between an internal entrance flow conduit and an internal discharge flow conduit, the return flow conduit providing an internal fluid flow path in a direction from the peak towards the base; and
      a center column having an internal bore and located along an axis of the desalination structure, where the external fluid flow path and the internal fluid flow path are spaced apart from an evaporation zone, the evaporation zone being located within the desalination structure exterior of the center column;
   pumping a saline water through a water supply line located within the center column;
   spraying the saline water to provide a mist to the evaporation zone;
   heating an air flow from a base within the air flow path to form a hot air supply;

heating the mist with the hot air supply delivered through the air flow path to the) evaporation zone to evaporate the mist within the evaporation zone and form an evaporated fluid;

diverting a diverted portion of the hot air supply into the return flow conduit and mixing the diverted portion of the hot air supply with an ambient air to form the air flow; and condensing the evaporated fluid within the center column; where the diverted portion of the hot air supply delivered through the air flow path heats the air flow; and the evaporated fluid traveling in a direction from the peak towards the base heats the saline water as the saline water travels in a direction from the base towards the peak.

9. The method of claim 8, where heating the air flow to form the hot air supply includes heating the air flow to a temperature that vaporizes the saline water that is delivered through the nozzle.

10. The method of claim 8, where providing the desalination structure includes providing the desalination structure with a shape that is an eight sided pyramid.

11. The method of claim 8, where diverting the diverted portion of the hot air supply includes directing the diverted portion of the hot air supply through an opening of the return flow conduit at a location within the evaporation zone.

12. The method of claim 8, where diverting the diverted portion of the hot air supply includes directing the diverted portion of the hot air supply through an opening of the return flow conduit at a location along the external fluid flow path.

13. The method of claim 8, further including monitoring a temperature of the hot air, and:

increasing the flow rate of the saline water being delivered through the center column when the temperature of the hot air increases; and decreasing the flow rate of the saline water being delivered through the center column when the temperature of the hot air decreases.

14. A system for circulating hot air in a solar desalination system, the system including:

a desalination structure, the desalination structure having:

an inclined outer surface with a base that is larger in diameter than a peak, the inclined outer surface having an external surface layer that is transparent, and an internal surface layer that is dark in color, with an air flow path defined between the external surface layer and the internal surface layer providing an external fluid flow path from the base towards the peak;

a return flow conduit defined between an internal entrance flow conduit and an internal discharge flow conduit, the return flow conduit providing an internal fluid flow path in a direction from the peak towards the base; and a center column having an internal bore and located along an axis of the desalination structure, where the external fluid flow path and the internal fluid flow path are spaced apart from an evaporation zone, the evaporation zone being located within the desalination structure exterior of the center column; and a nozzle that extends through a sidewall of the center column operable to deliver a saline water through the nozzle to provide a mist within the evaporation zone; where the air flow path is oriented to heat an air flow from a base within the air flow path to form a hot air supply so that the hot air supply is delivered through the air flow path and heats the mist to form an evaporated fluid; and the return flow conduit is oriented to divert a diverted portion of the hot air supply through the air flow path and into the return flow conduit, mixing the diverted portion of the hot air supply with an ambient air to form the air flow, the diverted portion of the hot air supply heating the air flow.

15. The system of claim 14, where the air flow is at a temperature that vaporizes the saline water that is delivered through the nozzle.

16. The system of claim 14, where the desalination structure has a shape that has eight sides.

17. The system of claim 14, where an opening of the return flow conduit is at a location outside of the external fluid flow path.

18. The system of claim 14, where an opening of the return flow conduit is at a location along the external fluid flow path.

19. The system of claim 14, further including a temperature sensor operable to monitor a temperature of the hot air, and a pump that is operable to adjust a flow rate of the saline water through the center column based on the temperature of the hot air.

* * * * *